March 8, 1927. 1,619,958
J. T. SANNAR ET AL
LOG SECURING DEVICE
Filed March 11, 1925
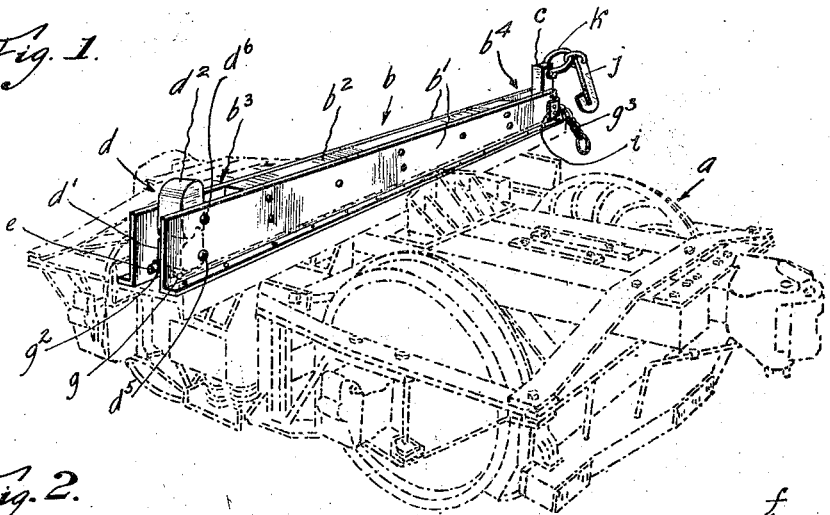
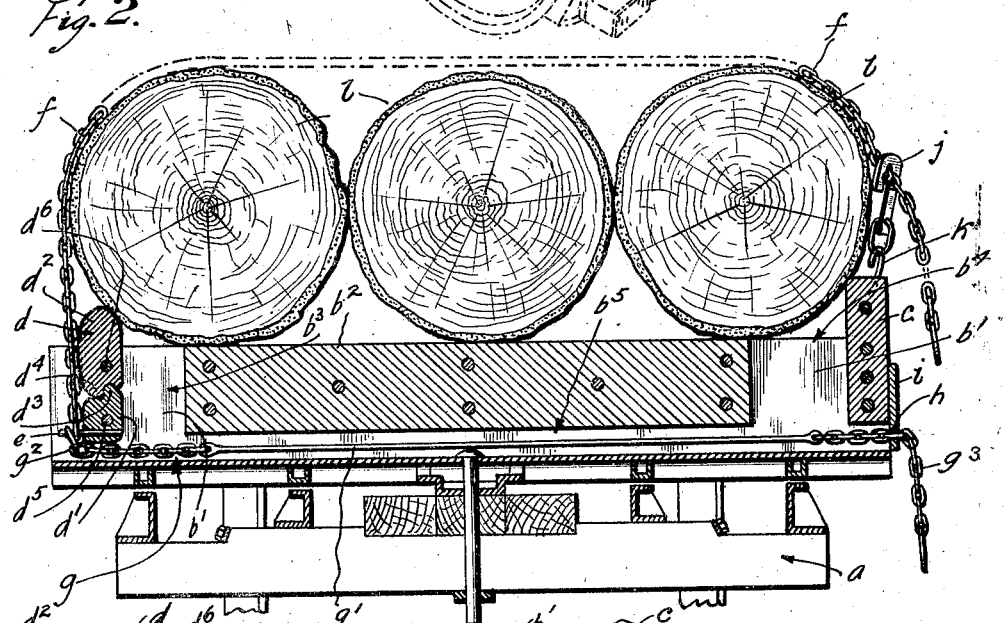
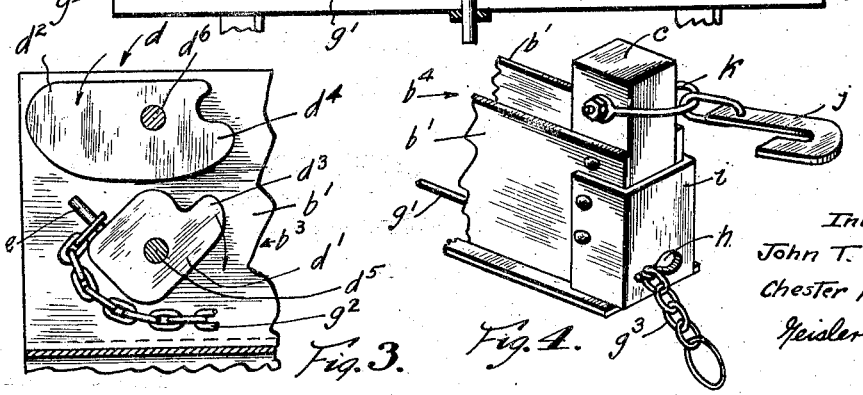
Inventors:
John T. Sannar
Chester R. Lawler
Geisler & Ramsey
Attorney Patented Mar. 8, 1927.

1,619,958

UNITED STATES PATENT OFFICE.

JOHN T. SANNAR AND CHESTER R. LAWLER, OF ENTERPRISE, OREGON.

LOG-SECURING DEVICE.

Application filed March 11, 1925. Serial No. 14,703.

Our invention relates to railroad trucks which are especially adapted for carrying logs and the object of our invention is to provide efficient means for securing the logs in place on the truck, and so arranged that they may be readily released without damage to the person handling the truck.

A further object of our invention is to provide means of the character mentioned which are simple and compact in construction, very sturdy, and adapted to firmly hold the logs in place; and which means furthermore are easily applied to standard trucks and cars. In this respect our invention is intended as an improvement over the devices disclosed in Letters Patent of the United States, entitled "Logging truck," No. 1,512,771, granted October 21, 1924, to ourselves.

A further and particular object of our present invention is to embody in structures of this character, an improved chock which is arranged to be used with a wrapper chain for holding the logs in place and is adapted to relieve a large portion of the strain which would otherwise be exerted upon said wrapper chain. Said chock is made up of a plurality of co-operating pivoted members which are movable into engaging and disengaging positions, relatively to the truck. In engaging position, said sections receive auxiliary support from the taut wrapper chain which is placed about the logs. That is, the taut wrapper chain extends alongside of said sections of the chock and tends to hold the uppermost section in engagement with the logs so as to hold them in place. This not only minimizes the necessary tautness to which the wrapper chains must be subjected but also tends to relieve the strain upon the means for holding the chock sections in engaging position.

The details of construction of our invention are hereinafter fully described with reference to the accompanying drawings in which:

Fig. 1 is a perspective view of a logging truck shown in dotted outline and with a car bunk and releasing mechanism carried thereby, said bunk and releasing mechanism being shown in full lines;

Fig. 2 is a vertical section through said bunk and said releasing mechanism and shows the arrangement of the devices when supporting a load of logs;

Fig. 3 is a fragmentary view of our improved chock with the portions arranged in releasing position; and Fig. 4 is a fragmentary perspective view of the securing devices in our invention.

Our invention is adapted for use upon a logging truck or car $a$ and comprises a transverse member $b$ which is commonly known as a bunk. Said member comprises two L-shaped angular sections $b'$ spaced apart by a member $b^2$ which is shorter and narrower than said L-shaped member $b'$, thus leaving bifurcated portions $b^3$ and $b^4$ at each end and a space $b^5$ beneath the same. In the bifurcated portion $b^4$ at one end of said transverse member a fixed chock $c$ is mounted and in the bifurcated portion $b^3$ at the opposite end, our improved jointed chock $d$ is mounted. Said jointed chock is made up of two sections $d'$ and $d^2$ which have co-operating portions or fingers $d^3$ and $d^4$, respectively, which engage each other and tend to hold the chock $d$ in upright or engaging position, as shown in Fig. 2. Said fingers permit said jointed chock to become separated when the upper section $d^2$ is moved in a counter-clockwise direction, as shown in Fig. 3. This causes the lower section $d'$ to move in a clockwise direction.

The member $d'$ is pivoted upon a pin $d^5$ which extends through the angular sections $b'$ and the member $d^2$ is pivoted upon a pin $d^6$, which is similarly carried by said sections $b'$. Said pin $d^6$ is arranged so that when said member $d^2$ moves to releasing position it lies wholly below the top of the angular sections $b'$ and thus out of the path of the logs which roll from off said end. In other words, the pivot for said member $d^2$ is arranged so that when said car stake is tripped the portions are permitted to fall below the upper surface of the transverse members so as not to be injured by the logs rolled over the same.

The member $d'$ carries a pin $e$ which is adapted to hold the free end of the wrapper chain $f$ and one end of the tripping member $g$. Said tripping member is preferably made up of a rod $g'$, provided at each end with short lengths of chain $g^2$ and $g^3$. Said spacing member $b^2$ is slightly less in width than said angular members $b'$ and thus a space $b^5$ below said spacing member $b^2$ is provided which constitutes a passageway in which said tripping member may slide.

As shown in Fig. 2, the free end of the chain $g^2$ is placed on said pin $e$, over the free end of the wrapper chain $f$, so as to hold the same in place. The chain $g^3$ passes through the key-shaped hole $h$ in the clip $i$, at the opposite end of said transverse member. When it passes through the narrow portion of the hole is held in place thereby.

The end of the wrapper chain $f$ at that side is fastened by a hook-shaped member $j$ which is held by a clevis $k$ fastened to the car stake $c$. Said hook-shaped member $j$ is adapted to clip one link of the chain which is arranged flatwise to said hook and the links at each side of said link, being arranged transversely thereto, tend to prevent said hook from slipping from place.

The operation of our device is as follows:

The jointed chock $d$ is arranged so that the parts are alined and said chock assumes a vertical position relatively to the transverse member so as to be arranged in engaging position, relatively to the logs. The free end of the wrapper chain is passed over the pin $e$ and the end of the chain $g^2$ is also passed over said pin so as to hold the end of the wrapper chain $f$ in place. Said tripping devices are then drawn taut and one link of the chain $g^3$ is passed into the narrow portion of the key-shaped hole $k$ so as to hold said car stake $d$ in upright position.

Logs $l$ are then placed on said truck and one end of said logs is supported by the transverse member $b$ at each end thereof. Said logs are prevented from rolling off the ends of said transverse members by the chocks $c$ and $d$. When a sufficient load of said logs have been loaded in place, said wrapper chains are thrown over said logs and made tight and caught by the hook-shaped member $j$. The logs can then be safely transported on said trucks to their destination.

Upon reaching their destination, the tripping devices can be released from the side away from the one upon which said logs are dumped. This is accomplished by removing the chain $g^3$ from the narrow portion of the hole $h$ and permitting it to slide through the larger portion. This permits the member $d'$ of the chock $d$ to rotate clockwise and permits the other portion $d^2$ to rotate counterclockwise and to assume a position in which it lies below the top of the members $b'$. The rotating of member $d'$ in the opposite direction from member $d^2$ permits the taut wrapper chain to fly from off the pin $e$ and to pull the chain $g^2$ from off said pin also. The logs $l$ are then permitted to roll off the end of said transverse members.

As can be noted in Fig. 2, the portions $d'$ and $d^2$ of the jointed car stake $d$ are arranged so that the wrapper chain $f$ extends along one side thereof to hold the same in position. That is, the tension of the wrapper chain tends to hold said sections in position against the force of the logs to move said member $d^2$ outwardly. The arrangement of the devices in this manner thus tends to eliminate somewhat, the tension to which the tripping devices and also the wrapper chains would be otherwise subjected, in holding said chock members in vertical, engaging position.

We claim:

1. In a logging truck, log securing means comprising a chock at one side thereof, said chock composed of a plurality of co-operating members adapted to be moved into log engaging and disengaging and releasing positions, a pin carried by one member of said chock, and a wrapper chain, one end of which is fastened at the opposite side of said car, with its free end mounted over said pin, said chain when engaged with said pin being arranged to support one of said chock members in log engaging position.

2. In a logging truck, log securing means comprising a chock at one side thereof, said chock composed of a plurality of co-operating members adapted to be moved into log engaging and disengaging and releasing positions, a pin carried by one member of said chock, a wrapper chain, one end of which is fastened at the opposite side of said car with its free end mounted over said pin, said chain when engaged with said pin being arranged to support said chock members in log engaging position, and means engaged with one of said members and the opposite side of the car for holding the chock members in log engaging position.

3. In a logging truck, log securing means comprising a chock at one side thereof, said chock composed of a plurality of co-operating members adapted to be moved into log engaging and disengaging and releasing positions, a pin carried by one member of said chock, a wrapper chain one end of which is fastened at the opposite side of said car with its free end mounted over said pin, said chain when engaged with said pin being arranged to support said chock members in log engaging position, and a chain engaged with said pin and releasably fastened at the opposite side of the car for holding the chock members in log engaging position.

4. In a logging truck, log securing means comprising a pivoted vertically movable chock at one side of the truck, a pin carried thereby, a wrapper chain for the logs, one end of which is fastened at the opposite side of the truck and provided with an eye at its free end for securing on said pin, a trip element extending across the truck and provided with an eye at one end also for securing on said pin, and, releasable means for securing the opposite end of the trip element to hold the pin against the strain of the wrapper chain.

5. In a logging truck, log securing means comprising a pivoted vertically movable chock at one side of the truck, said chock composed of two members pivoted one above the other, a pin carried thereby, said members provided with means for engaging with each other, and adapted to fall in opposite directions when released, the lower of said members provided with a pin, a wrapper chain for the logs, one end of which is fastened at the opposite side of the truck and provided with an eye at its free end for securing on said pin, a trip element extending across the truck and provided with an eye at one end also for securing on said pin, and releasable means for securing the opposite end of the trip element to hold the pin against the strain of the wrapper chain.

JOHN T. SANNAR.
CHESTER R. LAWLER.